United States Patent
Umemoto et al.

(10) Patent No.: US 10,988,607 B2
(45) Date of Patent: Apr. 27, 2021

(54) CURABLE RESIN COMPOSITION AND OPTICAL MEMBER

(71) Applicant: DAICEL CORPORATION, Osaka (JP)

(72) Inventors: Kouichi Umemoto, Himeji (JP); Takahiro Sakakibara, Himeji (JP)

(73) Assignee: DAICEL CORPORATION, Osaka (JP)

( * ) Notice: Subject to any disclaimer, the term of this patent is extended or adjusted under 35 U.S.C. 154(b) by 211 days.

(21) Appl. No.: 16/085,918

(22) PCT Filed: Feb. 22, 2017

(86) PCT No.: PCT/JP2017/006603
§ 371 (c)(1),
(2) Date: Sep. 17, 2018

(87) PCT Pub. No.: WO2017/159253
PCT Pub. Date: Sep. 21, 2017

(65) Prior Publication Data
US 2019/0031874 A1  Jan. 31, 2019

(30) Foreign Application Priority Data
Mar. 18, 2016 (JP) .............................. JP2016-054663

(51) Int. Cl.
| C08K 3/36 | (2006.01) |
| C08L 33/06 | (2006.01) |
| G02B 1/14 | (2015.01) |
| C08K 9/06 | (2006.01) |
| C08F 292/00 | (2006.01) |
| C08K 3/04 | (2006.01) |
| C08K 3/08 | (2006.01) |
| C08K 5/5419 | (2006.01) |
| C08K 7/26 | (2006.01) |
| C08F 222/10 | (2006.01) |
| C08F 230/08 | (2006.01) |
| C08K 3/22 | (2006.01) |

(52) U.S. Cl.
CPC .......... *C08L 33/066* (2013.01); *C08F 292/00* (2013.01); *C08K 3/04* (2013.01); *C08K 3/08* (2013.01); *C08K 3/36* (2013.01); *C08K 5/5419* (2013.01); *C08K 7/26* (2013.01); *C08K 9/06* (2013.01); *G02B 1/14* (2015.01); *C08F 222/10* (2013.01); *C08F 222/1006* (2013.01); *C08F 230/08* (2013.01); *C08K 2003/2244* (2013.01); *C08K 2201/003* (2013.01); *C08K 2201/005* (2013.01); *C08K 2201/009* (2013.01); *C08K 2201/011* (2013.01)

(58) Field of Classification Search
CPC ... C08K 3/04; C08K 9/06; C08K 3/36; C08K 2003/2244
See application file for complete search history.

(56) References Cited

U.S. PATENT DOCUMENTS

| 5,454,844 A * | 10/1995 | Hibbard .................... B24D 3/28 51/295 |
| 2005/0008560 A1 | 1/2005 | Kataoka et al. |
| 2005/0267230 A1 | 12/2005 | Esaki et al. |
| 2008/0249229 A1 | 10/2008 | Lukehart et al. |
| 2010/0089752 A1 | 4/2010 | Linford et al. |
| 2015/0017386 A1* | 1/2015 | Kolb ...................... G02B 1/118 428/149 |
| 2016/0077239 A1 | 3/2016 | Asahi et al. |
| 2017/0183234 A1 | 6/2017 | Wada et al. |

FOREIGN PATENT DOCUMENTS

| EP | 1561765 A1 | 8/2005 |
| EP | 3 150 552 A1 | 4/2017 |
| JP | 2004-51937 A | 2/2004 |
| JP | 2005-1983 A | 1/2005 |
| JP | 2005-185924 A | 7/2005 |

(Continued)

OTHER PUBLICATIONS

International Search Report for PCT/JP2017/006603 (PCT/ISA/210) dated Mar. 21, 2017.
European Office Action, dated Jun. 23, 2020, for counterpart European Application No. 17766258.2.
Jeong et al., "Effect of Silane Coupling Agent on the Optical and the Mechanical Characteristics of Nanodiamond/Acrylic Resin Composites", Journal of the Korean Physical Society, Oct. 2014, vol. 65, No. 7. pp. 1049-1053 (5 pages).

(Continued)

*Primary Examiner* — Margaret G Moore
(74) *Attorney, Agent, or Firm* — Birch, Stewart, Kolasch & Birch, LLP.

(57) ABSTRACT

A resin composition (X), which is a curable resin composition according to the present invention, contains a curable resin component (10), a surface-modified nanodiamond (20), and an organic medium. The surface-modified nanodiamond (20) includes a ND particle (21), which is a nanodiamond particle, and a silane coupling agent (22). The silane coupling agent (22) has a (meth)acryloyl-containing organic chain and is bonded to the ND particle (21). The resin composition (X) is suitable for forming a nanodiamond-dispersed cured resin portion having both high transparency and high scratch resistance. An optical element according to the present invention has a light-transmitting region and includes a cured resin portion, which is a cured product of the resin composition (X), in at least part of the light-transmitting region. The optical element is advantageous for actually providing an optical element including a cured resin portion or cured resin layer having both high transparency and high scratch resistance.

14 Claims, 2 Drawing Sheets

(56) References Cited

FOREIGN PATENT DOCUMENTS

| JP | 2009-162848 A | 7/2009 |
|---|---|---|
| JP | 2010-126669 A | 6/2010 |
| JP | 2012-35536 A | 2/2012 |
| JP | 2015-43046 A | 8/2015 |
| JP | 2015-227260 A | 12/2015 |
| JP | 2016-61794 A | 4/2016 |
| KR | 10-2013-0093393 A | 8/2013 |
| WO | WO 2005/085359 A1 | 9/2005 |
| WO | WO 2009/098883 A1 | 8/2009 |

OTHER PUBLICATIONS

Extended European Search Report for counterpart European Application No. 17766258.2, dated Oct. 2, 2019.

Japanese Office Action, dated Nov. 17, 2020, for corresponding Japanese Application No. 2018-505385, with an English machine translation.

* cited by examiner

[FIG. 1]
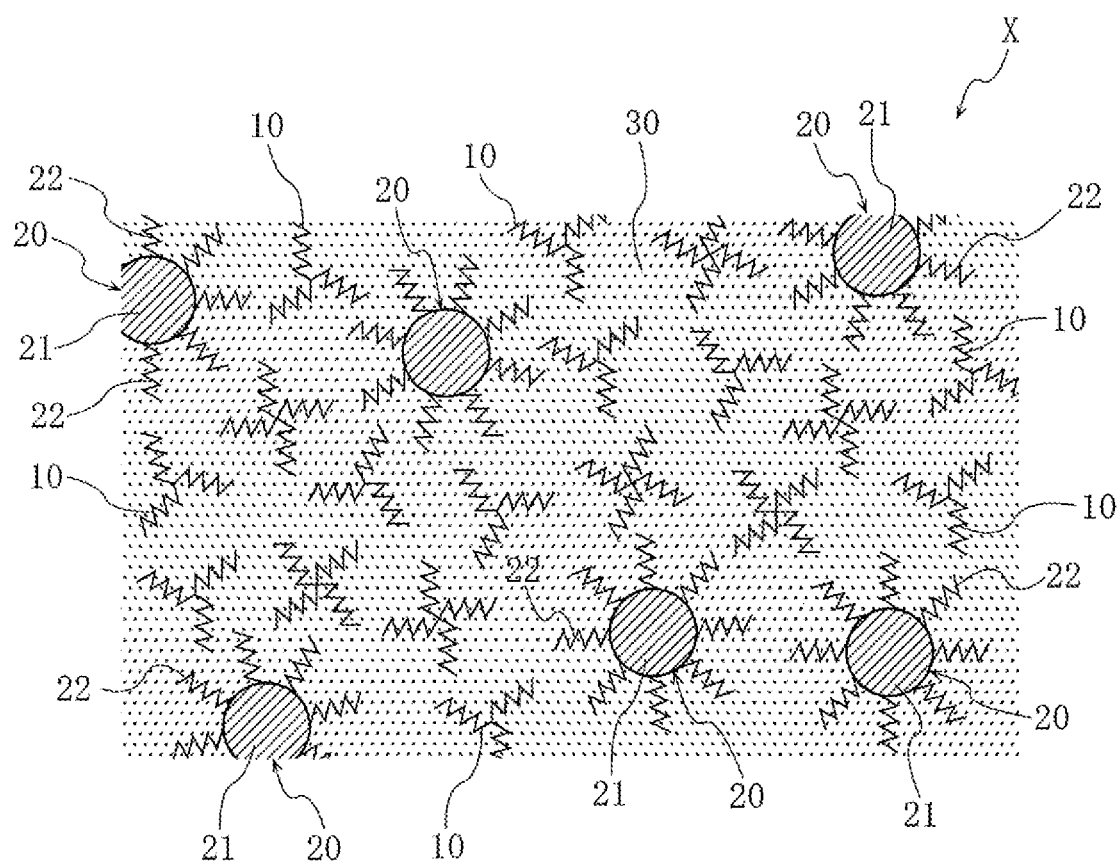

[FIG. 2]
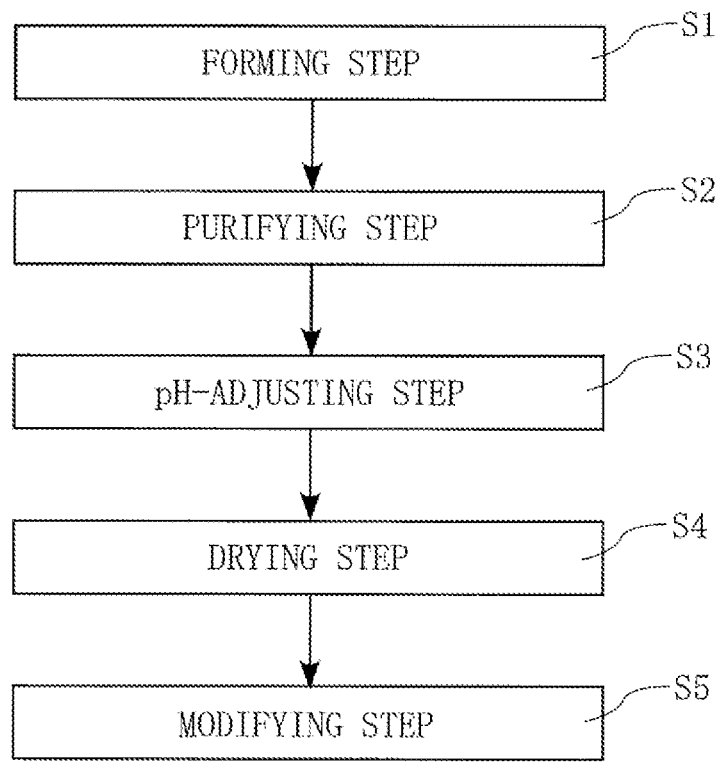
[FIG. 3]
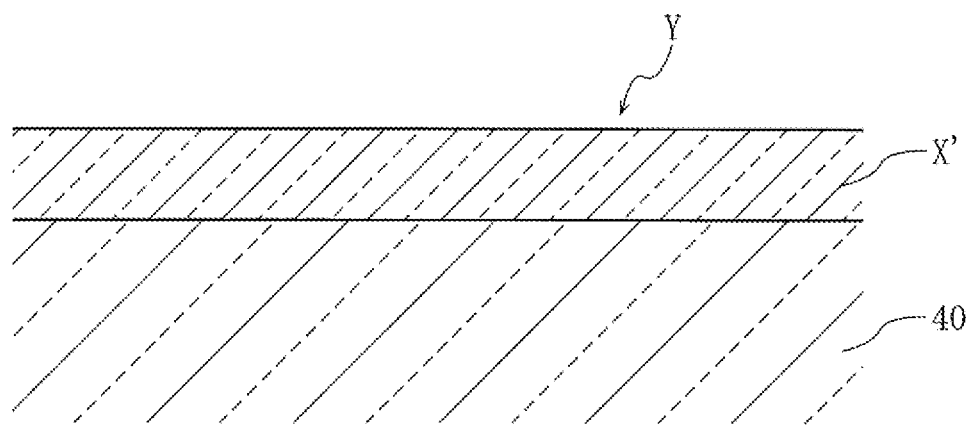

CURABLE RESIN COMPOSITION AND OPTICAL MEMBER

TECHNICAL FIELD

The present invention relates to a curable resin composition that is combined with an inorganic material; and an optical member (optical element) including a cured resin portion formed from the composition as above. This application claims priority to Japanese Patent Application No. 2016-054663, filed on Mar. 18, 2016, the entire contents of which application are incorporated herein by reference.

BACKGROUND ART

Various applications demand plastic materials or resinous materials that have both excellent transparency and high scratch resistance. Non-limiting examples of the applications include applications in or for various camera lenses; spectacle lens surface coatings; and antireflective films, index matching films, and hardcoat layers in various optical elements. As such resinous materials, there have been developed, for example, composite materials containing fine zirconia particles or fine titanium oxide particles dispersed therein (for example, Patent Literature (PTL) 1 and PTL 2 below).

On the other hand, fine particulate diamond materials, which are called nanodiamonds, have been developed more and more. Of such nanodiamonds, so-called single-nano-sized nanodiamonds having a particle diameter of 10 nm or less may be required in some uses. Techniques for such nanodiamonds can be found typically in PTL 3 and PTL 4 below.

CITATION LIST

Patent Literature

PTL 1: Japanese Unexamined Patent Application Publication (JP-A) No. 2005-185924
PTL 2: JP-A No. 2009-162848
PTL 3: JP-A No. 2005-001983
PTL 4: JP-A No. 2010-126669

SUMMARY OF INVENTION

Technical Problem

Nanodiamonds can offer properties such as high mechanical strength and high refractive index, as with bulk diamond. The nanodiamonds, which are fine particles, generally include a large proportion of surface atoms (which are coordinationally unsaturated) and are thereby liable to aggregate, because of a high magnitude of van der Waals force in total, which can act upon between surface atoms of adjacent particles. In addition, the nanodiamond particles can undergo a phenomenon of agglutination in which the particles aggregate very firmly (agglutinate) by the contribution of Coulomb interactions between crystal faces of adjacent crystallites. The nanodiamond particles have such unique properties in which multiple interactions can occur between crystallites or primary particles. Thus, there are technical difficulties in developing a state where the nanodiamond particles are dispersed in a resin material. Such low dispersibility of nanodiamond particles is a factor that causes low degree of freedom in designing of composite materials containing the nanodiamond particles. In particular, the low dispersibility may impede the combining or hybridization of organic materials with nanodiamonds.

The present invention has been made under these circumstances and has an object to provide a curable resin composition that is suitable for the formation of a nanodiamond-dispersed cured resin portion having both high transparency and high scratch resistance. The present invention has another object to provide an optical element including such a cured resin portion.

Solution to Problem

The present invention provides, according to a first aspect, a curable resin composition. The composition contains a component (curable resin component) for the formation of a cured resin; a surface-modified nanodiamond; and an organic medium. The surface-modified nanodiamond includes a nanodiamond particle, and a silane coupling agent having a (meth)acryloyl-containing organic chain and being bonded to the nanodiamond particle. The curable resin composition according to this aspect is a material for the formation of an optically transparent cured resin portion or cured resin layer, typically by applying the composition onto a predetermined substrate and then drying and curing the applied composition. The curable resin component is a component capable of forming a cured resin and typically includes a curable monomer and/or oligomer that undergoes a polymerization reaction by the application of at least one of light and heat. The nanodiamond particles of the surface-modified nanodiamond may be any of nanodiamond primary particles and nanodiamond secondary particles. As used herein, the term "nanodiamond primary particle" refers to a nanodiamond having a particle diameter of 10 nm or less. Silane coupling agents are organosilicon compounds that contain both a silicon-containing reactive group and an organic chain bonded to the silicon, where the silicon-containing reactive group will form a chemical bond with an inorganic material. The silane coupling agent of the surface-modified nanodiamond in the present invention forms a covalent bond between the reactive group and the nanodiamond particle surface and is bonded to the particle. As used herein, the term "(meth)acryloyl group" refers to an acryloyl group and/or a methacryloyl group.

The surface-modified nanodiamond in the curable resin composition, which has the configuration as above, includes the silane coupling agent containing a (meth)acryloyl-containing organic chain, as a surface-modifying component that is bonded via a covalent bond to the nanodiamond particle, as described above. The (meth)acryloyl-containing organic chain in the silane coupling agent is positioned in each surface-modified nanodiamond near to the interface with surroundings of the surface-modified nanodiamond. The nanodiamond particles with surface modification in the embodiment as above have higher affinity for organic materials, as compared with nanodiamond particles without surface modification. Accordingly, the surface-modified nanodiamond is suitable for actually having high dispersion stability in the curable resin composition, which contains the curable resin component and the organic medium together with the surface-modified nanodiamond.

In addition, the surface-modified nanodiamond contains a (meth)acryloyl group in the organic chain present at the interface with surroundings thereof, where the (meth)acryloyl group serves as a polymerizable group. In a process of polymerization of the curable resin component in the composition, the (meth)acryloyl group of the surface-modified nanodiamond can copolymerize with the curable resin component to form a cured resin portion or cured resin layer. The cured resin portion or cured resin layer contains the surface-modified nanodiamond or nanodiamond particles as being included in a cured resin matrix. The surface-modified nanodiamond, which is suitable for actually having high dispersion stability in the curable resin composition as described above, is suitable for dispersing and still incorporating nanodiamond particles into a cured resin matrix. Specifically, in a configuration, the (meth)acryloyl groups, which are polymerizable groups, are present at the surface of the surface-modified nanodiamond, which is suitable for actually having high dispersion stability in the curable resin composition. This configuration is suitable for allowing the curable resin composition to form a nanocomposite material including a cured resin (as a matrix), and nanodiamond particles dispersed in the cured resin matrix. In a configuration, the nanodiamond particles are dispersed in the cured resin matrix of the cured resin portion or cured resin layer formed from the curable resin composition, where the nanodiamond particles are fine particles of diamond, which has very high mechanical strength. This configuration is suitable for allowing the cured resin portion or cured resin layer to actually have both high transparency and high scratch resistance.

As described above, the curable resin composition is suitable for the formation of a nanodiamond-dispersed cured resin portion that has both high transparency and high scratch resistance.

Preferably, nanodiamond particles are detonation nanodiamond particles, which are nanodiamond particles formed by a detonation technique. The detonation nanodiamond particles each have a single-nanometer primary particle diameter. The configuration as above is advantageous for allowing the curable resin composition to form a cured resin portion that actually has high transparency.

The surface-modified nanodiamond (as particles) has a particle diameter D50 (median diameter) of preferably 50 nm or less, more preferably 30 nm or less, and furthermore preferably 20 nm or less. This configuration is advantageous for allowing the curable resin composition to form a cured resin portion that actually has high transparency.

Preferably, the organic chain of the silane coupling agent in the surface-modified nanodiamond is at least one of propyl acrylate and propyl methacrylate. This configuration is advantageous for allowing the curable resin composition to form a cured resin portion that actually has both high transparency and high scratch resistance.

Preferably, the curable resin component contains a (meth)acryloyl group. More preferably, the curable resin component is at least one selected from the group consisting of pentaerythritol triacrylate, pentaerythritol tetraacrylate, oligomers of pentaerythritol triacrylate, oligomers of pentaerythritol tetraacrylate, and oligomers of pentaerythritol triacrylate and pentaerythritol tetraacrylate. This configuration facilitates stable dispersion of the surface-modified nanodiamond, which contain (meth)acryloyl groups in the surface organic chains, in the curable resin composition. In addition, this configuration facilitates the copolymerization of the (meth)acryloyl group in the surface organic chain of the surface-modified nanodiamond with the curable resin component in a process of polymerization of the curable resin component in the curable resin composition.

The curable resin component is present in a proportion of preferably 30 mass percent or more, more preferably 40 mass percent or more, furthermore preferably 55 mass percent or more, and still more preferably 60 mass percent or more, of solids contained in the curable resin composition (the totality of solids contained in the composition). These are preferred from the viewpoint of allowing the curable resin composition to form a cured resin portion that sufficiently offer properties of the cured resin, according to the intended use thereof. The curable resin component is present in a proportion of preferably 99.9 mass percent or less, more preferably 99 mass percent or less, and furthermore preferably 95 mass percent or more, of the totality of solids contained in the curable resin composition. These are preferred from the viewpoint of allowing the curable resin composition to form a cured resin portion that can sufficiently enjoy advantageous effects resulting from the presence of the surface-modified nanodiamond, according to the intended use thereof.

Preferably, the organic medium includes tetrahydrofuran. This configuration facilitates the stable dispersion of the surface-modified nanodiamond in the curable resin composition.

The curable resin composition according to the first aspect of the present invention preferably contains zirconium in a proportion of 0.01 mass percent or more of the totality (total content) of the surface-modified nanodiamond and the zirconium. This configuration probably facilitates the stable dispersion of the surface-modified nanodiamond in the curable resin composition.

The curable resin composition according to the first aspect of the present invention preferably further contains hollow silica particles. The hollow silica particles in the curable resin composition have particle diameters of preferably 1 nm or more, and preferably 1000 nm or less, more preferably 500 nm or less, and furthermore preferably 300 nm or less. The hollow silica particles may be present in the curable resin composition in a content of preferably 0.5 mass percent or more, more preferably 1 mass percent or more, and furthermore preferably 2 mass percent or more; and in a content of preferably 90 mass percent or less, more preferably 80 mass percent or less, and furthermore preferably 60 mass percent or less. These configurations are advantageous for allowing the curable resin composition to form a cured resin portion that actually has satisfactory antireflection properties, in addition to high transparency and high scratch resistance.

The present invention provides, according to a second aspect, an optical element. The optical element has a light-transmitting region and includes, in at least part of the light-transmitting region, a cured product of the curable resin composition according to the first aspect of the present invention. The optical element according to the second aspect is advantageous for actually providing an optical element with a cured resin portion or cured resin layer that has both high transparency and high scratch resistance. The optical element typically includes a multilayered portion including a substrate and the cured product. In this case, the multilayered portion has a haze of preferably 2.0% or less, and more preferably 1.0% or less. As used herein, the "haze" is defined as a value measured in conformity to Japanese Industrial Standard (JIS) K 7136.

BRIEF DESCRIPTION OF DRAWINGS

FIG. 1 is a schematic enlarged view of a curable resin composition according to one embodiment of the present invention;

FIG. 2 is a process chart illustrating an exemplary method for producing a surface-modified nanodiamond to be contained in the curable resin composition illustrated in FIG. 1; and FIG. 3 is a local sectional view of an optical element according to another embodiment of the present invention.

DESCRIPTION OF EMBODIMENTS

FIG. 1 is a schematic enlarged view of a resin composition X, which is a curable resin composition according to one embodiment of the present invention. The resin composition X contains a curable resin component 10, a surface-modified nanodiamond 20, and a dispersion medium 30. The resin composition X is a material for the formation of an optically transparent cured resin layer or cured resin portion, typically by applying the composition onto a predetermined substrate and then drying and curing the applied composition.

The curable resin component 10 contained in the resin composition X is a component for the formation of a cured resin, which will serve as a principal material of a cured resin portion or cured resin layer formed from the resin composition X. The curable resin component 10 in this embodiment is at least one of a monomer and an oligomer for the formation of a cured acrylic resin due to a polymerization reaction proceeded by the application of at least one of light and heat.

Non-limiting examples of the monomer as the curable resin component 10, or a monomer to form the oligomer as the curable resin component 10, include multifunctional (meth)acrylates each containing two or more (meth)acryloyl groups. As used herein, the term "(meth)acryloyl group" refers to an acryloyl group and/or a methacryloyl group. The term "(meth)acrylate" refers to an acrylate and/or a methacrylate. Examples of the multifunctional (meth)acrylates include bifunctional (meth)acrylates, trifunctional (meth)acrylates, and tetrafunctional or higher multifunctional (meth)acrylates. Non-limiting examples of the bifunctional (meth)acrylates include dipropylene glycol di(meth)acrylate, 1,6-hexanediol di(meth)acrylate, tripropylene glycol di(meth)acrylate, polyethylene glycol di(meth)acrylates, PO-modified neopentyl glycol di(meth)acrylate, EO-modified bisphenol-A di(meth)acrylate, EO-modified bisphenol-F di(meth)acrylate, EO-modified isocyanuric acid di(meth)acrylate, and tricyclodecanedimethanol di(meth)acrylate. Non-limiting examples of the trifunctional (meth)acrylates include pentaerythritol tri(meth)acrylate, trimethylolpropane tri(meth)acrylate, ethoxylated trimethylolpropane tri(meth)acrylate, propoxylated trimethylolpropane tri(meth)acrylate, propoxylated glycerol tri(meth)acrylate, and EO-modified isocyanuric acid tri(meth)acrylate. Non-limiting examples of the tetrafunctional or higher multifunctional (meth)acrylates include ethoxylated pentaerythritol tetra(meth)acrylate, ditrimethylolpropane tetra(meth)acrylate, pentaerythritol tetra(meth)acrylate, dipentaerythritol penta(meth)acrylate, and dipentaerythritol hexa(meth)acrylate. The term "EO-modified" (compound) refers to a compound having a poly(oxyethylene) chain. The term "PO-modified" (compound) refers to a compound having a poly(oxypropylene) chain. The monomer as the curable resin component 10, and a monomer to form the oligomer as the curable resin component 10, may include each of different multifunctional (meth)acrylates alone or in combination. The curable resin component 10 in the embodiment is preferably at least one selected from the group consisting of pentaerythritol triacrylate, pentaerythritol tetraacrylate, oligomers of pentaerythritol triacrylate, oligomers of pentaerythritol tetraacrylate, and oligomers of pentaerythritol triacrylate and pentaerythritol tetraacrylate. This is preferred from the viewpoints of dispersion stability of the surface-modified nanodiamond 20 in the resin composition X and dispersibility of the surface-modified nanodiamond 20 in the cured resin portion to be formed.

The curable resin component 10 may further include, in addition to the multifunctional (meth)acrylate(s), a monofunctional (meth)acrylate containing one (meth)acryloyl group, where the monofunctional (meth)acrylate may be present as a monomer, or as a monomer unit in an oligomer. Non-limiting examples of the monofunctional (meth)acrylate include β-carboxyethyl (meth)acrylate, isobornyl (meth)acrylate, octyl (meth)acrylate, decyl (meth)acrylate, EO-modified phenol (meth)acrylate, EO-modified nonylphenol (meth)acrylate, and EO-modified 2-ethylhexyl (meth)acrylate. The monofunctional (meth)acrylate for the curable resin component 10 may include each of different monofunctional (meth)acrylates alone or in combination. The curable resin component 10 in the resin composition X includes the monofunctional (meth)acrylate(s) in the form of a monomer or in the form of a monomer unit in an oligomer, in a proportion of typically 50 mass percent or less, preferably 30 mass percent or less, and more preferably 20 mass percent or less.

The curable resin component 10 may further include a urethane (meth)acrylate and/or a polyester (meth)acrylate in the form of a monomer or in the form of a monomer unit in an oligomer, in addition to the multifunctional (meth)acrylate.

The curable resin component 10 as above is present in a proportion of preferably 30 mass percent or more, more preferably 40 mass percent or more, furthermore preferably 55 mass percent or more, and still more preferably 60 mass percent or more, of the totality of solids contained in the resin composition X. The curable resin component 10 is present in a proportion of preferably 99.9 mass percent or less, more preferably 99 mass percent or less, and furthermore preferably 95 mass percent or less, of the totality of the solids contained in the resin composition X.

Assume that the polymerization reaction of the curable resin component 10 is allowed to proceed by the application of light to form a cured resin portion or cured resin layer from the resin composition X. When this configuration is employed, the resin composition X contains a photoinitiator. Examples of the photoinitiator include, but are not limited to, benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, and thioxanthone photoinitiators. Non-limiting examples of the benzoin ether photoinitiators include benzoin methyl ether, benzoin ethyl ether, benzoin propyl ether, benzoin isopropyl ether, benzoin isobutyl ether, and 2,2-dimethoxy-1,2-diphenylethan-1-one. Non-limiting examples of the acetophenone photoinitiators include 2,2-diethoxyacetophenone, 2,2-dimethoxy-2-phenylacetophenone, 1-hydroxycyclohexyl phenyl ketone, 4-phenoxydichloroacetophenone, and 4-(t-butyl)dichloroacetophenone. Non-limiting examples of the α-ketol photoinitiators include 2-methyl-2-hydroxypropiophenone and 1-[4-(2-hydroxyethyl)phenyl]-2-methylpropan-1-one. A non-limiting example of the aromatic sulfonyl chloride photoinitiators is 2-naphthalenesulfonyl chloride. A non-limiting example of the photoactive oxime photoinitiators is 1-phenyl-1,1-propanedione-2-(O-ethoxycarbonyl)-oxime. A non-limiting example of the benzoin photoinitiators is benzoin. A non-limiting example of the benzil photoinitiators is benzil. Non-limiting examples of the benzophenone photoinitiators include benzophenone, benzoylbenzoic acid, 3,3'-dimethyl-4-methoxybenzophenone, and polyvinylbenzophenones. A non-limiting example of the ketal photoinitiators is benzil dimethyl ketal. Non-limiting examples of the thioxanthone photoinitiators include thioxanthone, 2-chlorothioxanthone, 2-methylthioxanthone, 2,4-dimethylthioxanthone, isopropylthioxanthone, 2,4-diisopropylthioxanthone, and dodecylthioxanthone. The resin composition X may contain the photoinitiator in a content of typically 0.1 to 10 parts by mass per 100 parts by mass of the totality of the curable resin component 10.

Assume that the polymerization reaction of the curable resin component 10 is allowed to proceed by the application of heat (heating) to form a cured resin portion or cured resin layer from the resin composition X. When this configuration is employed, the resin composition X contains a thermal initiator. Examples of the thermal initiator include, but are not limited to, azo polymerization initiators, peroxide polymerization initiators, and redox polymerization initiators. Non-limiting examples of the azo polymerization initiators include 2,2'-azobisisobutyronitrile, 2,2'-azobis-2-methylbutyronitrile, dimethyl 2,2'-azobis(2-methylpropionate), and 4,4'-azobis-4-cyanovaleric acid. Non-limiting examples of the peroxide polymerization initiators include dibenzoyl peroxide and tert-butyl permaleate. The resin composition X may contain the thermal initiator in a content of typically 0.1 to 10 parts by mass per 100 parts by mass of the totality of the curable resin component 10.

The surface-modified nanodiamond 20 contained in the resin composition X includes a ND particle 21, which is a fine particle of nanodiamond; and a silane coupling agent 22 bonded to the ND particle 21.

The ND particles 21 in the surface-modified nanodiamond 20 may be any of nanodiamond primary particles and nanodiamond secondary particles. In a configuration, the ND particles 21 are primary particles, which are smaller than secondary particles. This configuration is advantageous for allowing the resin composition X to form a cured resin portion or cured resin layer that actually has high transparency. The ND particles 21 are preferably detonation nanodiamond particles, which are nanodiamond particles formed by a detonation technique as described later, where such detonation nanodiamond particles have a single-nanometer primary particle diameter. The configuration as above is advantageous for allowing the resin composition X to form a cured resin portion that actually has high transparency. The ND particles 21 have a particle diameter D50 (median diameter) of typically 1 to 100 nm. The upper limit of the particle diameter D50 is preferably 40 nm, more preferably 20 nm, and furthermore preferably 10 nm. With a decreasing particle diameter D50 of the ND particles 21, the resin composition X more suitably forms a cured resin portion or cured resin layer that actually has high transparency. The "particle diameter D50" of fine particles is defined herein as a value measured by a so-called dynamic light scattering technique.

The silane coupling agent 22 in the surface-modified nanodiamond 20 is bonded to the ND particle 21. Silane coupling agents are organosilicon compounds that have both a silicon-containing reactive group and an organic chain bonded to the silicon, where the silicon-containing reactive group will form a chemical bond with an inorganic material. The silane coupling agent 22 forms a covalent bond between its reactive group and the surface of the ND particle 21 and is bonded to the ND particle 21. Non-limiting examples of the reactive group of a silane coupling agent that will constitute the silane coupling agent 22 bonded to the ND particle 21 include silanol group (—SiOH), and hydrolyzable groups that can form a silanol group. Non-limiting examples of such hydrolyzable groups include alkoxysilyl groups such as methoxy group and ethoxy group each of which is bonded to silicon; halosilyl groups such as chlorine and bromine each of which is bonded to silicon; and acetoxy group bonded to silicon. These hydrolyzable groups can form a silanol group through hydrolysis. The silanol group of the silane coupling agent can undergo dehydrative condensation typically with a hydroxy group at the surface of the ND particle 21, and this can give a chemical bond between the silane coupling agent and the surface of the ND particle 21.

The silane coupling agent 22 in the surface-modified nanodiamond 20 contains a (meth)acryloyl group in the organic chain thereof. As used herein, the term "(meth)acryloyl group" refers to an acryloyl group and/or a methacryloyl group. Preferred, but non-limiting examples of the (meth)acryloyl-containing organic chain in the silane coupling agent 22 include propyl acrylate and propyl methacrylate. This configuration facilitates the stable dispersion of the surface-modified nanodiamond 20 in the resin composition X, where surface-modified nanodiamond 20 each contain a (meth)acryloyl group in the surface organic chain. In addition, the configuration facilitates the copolymerization of the (meth)acryloyl group in the surface organic chain of the surface-modified nanodiamond 20 with the curable resin component 10, in the process of polymerization of the curable resin component 10 in the resin composition X. Non-limiting examples of the silane coupling agent to constitute the silane coupling agent 22 as above include 3-(trimethoxysilyl)propyl acrylate, 3-(trimethoxysilyl)propyl methacrylate, 3-(methyldimethoxysilyl) propyl methacrylate, 3-(methyldiethoxysilyl)propyl methacrylate, and 3-(triethoxysilyl)propyl methacrylate.

The surface-modified nanodiamond 20, which includes the ND particle 21 and the silane coupling agent 22 as above, has a particle diameter D50 (median diameter) of typically 10 to 120 nm. The upper limit of the particle diameter D50 is preferably 50 nm, more preferably 30 nm, and furthermore preferably 20 nm. With a decreasing particle diameter D50 of the surface-modified nanodiamond 20, the resin composition X more suitably forms a cured resin portion or cured resin layer that actually has high transparency.

The surface-modified nanodiamond 20 is present in the resin composition X in a content of typically 0.01 to 60 mass percent. The surface-modified nanodiamond 20 is present in the resin composition X in a content of preferably 0.1 mass percent or more, and more preferably 1 mass percent or more, from the viewpoint of balance typically between transparency and refractive index of the cured resin portion to be formed from the resin composition X. The surface-modified nanodiamond 20 is present in a proportion of typically 0.05 to 70 mass percent of the totality of the solids contained in the resin composition X, from the viewpoint of balance typically between transparency and refractive index of the cured resin portion to be formed from the resin composition X.

The dispersion medium 30 is a medium to allow the curable resin component 10 and the surface-modified nanodiamond 20 to suitably disperse in the resin composition X. The dispersion medium 30 is an organic dispersion medium that includes 50 mass percent or more of an organic medium (organic vehicle or solvent). Non-limiting examples of the organic medium include tetrahydrofuran, acetone, methyl ethyl ketone, 1-methoxypropanol, methyl isobutyl ketone, isopropanol, and 2-butanol. The dispersion medium 30 may include each of different organic media alone or in combination. The dispersion medium 30 preferably includes tetrahydrofuran. This configuration facilitates the stable dispersion of the surface-modified nanodiamond 20 in the resin composition X.

The resin composition X may further contain hollow silica particles. This configuration is advantageous for allowing the resin composition X to form a cured resin portion that offers antireflection properties. The hollow silica particles have particle diameters of preferably 1 to 1000 nm, more preferably 1 to 500 nm, and furthermore preferably 1 to 300 nm. The lower limit of the content of the hollow silica particles, when contained in the resin composition X, is preferably 0.5 mass percent, more preferably 1 mass percent, and furthermore preferably 2 mass percent; and the upper limit of the content is preferably 90 mass percent, more preferably 80 mass percent, and furthermore preferably 60 mass percent.

In addition to the above-mentioned components, the resin composition X may further contain one or more other components. Non-limiting examples of such other components include antifoaming agents, leveling agents, fluorine antifouling additives, and silicone antifouling additives. The resin composition X, when containing a fluorine antifouling additive, tends to form a cured resin portion that offers slipperiness (slippery smoothness). The appearance of slipperiness contributes to allowing the cured resin portion to actually have high scratch resistance. Non-limiting examples of commercial products of such fluorine antifouling additives include OPTOOL supplied by Daikin Industries Ltd.; KY-1200 Series supplied by Shin-Etsu Chemical Co., Ltd.; Megafac supplied by DIC Corporation; and Fclear supplied by KANTO DENKA KOGYO CO., LTD.

FIG. 2 is a process chart illustrating an example of methods for producing a surface-modified nanodiamond 20 to be contained in the resin composition X. This method includes a forming step S1, a purifying step S2, a pH-adjusting step S3, a drying step S4, and a modifying step S5.

In the forming step S1, detonation is performed to form nanodiamond. Initially, a shaped explosive equipped with an electric detonator is placed in a detonation pressure-tight chamber, and the chamber is hermetically sealed so that the explosive is coexistent with a gas having an atmospheric composition and being at normal atmospheric pressure in the chamber. The chamber is made typically of iron and has a capacity of typically 0.5 to 40 m$^3$. A non-limiting example of the explosive usable herein is a mixture of trinitrotoluene (TNT) with cyclotrimethylenetrinitramine, namely, hexogen (RDX). The mixture may have a mass ratio (TNT:RDX) of TNT to RDX in the range of typically from 40:60 to 60:40. The explosive is used in an amount of typically 0.05 to 2.0 kg.

In the forming step S1, next, the electric detonator is ignited to detonate the explosive in the chamber. As used herein, the term "detonation" refers to, among explosions associated with chemical reactions, one in which a flame front travels at a high speed faster than sound, where the reaction occurs at the flame front. In the detonation, the explosive partially undergoes incomplete combustion to liberate carbon, and the liberated carbon serves as a starting material and forms nanodiamond by the action of pressure and energy of a shock wave generated by the explosion. In the formation of such nanodiamond products by the detonation technique, initially, primary particles aggregate to form agglutinates, by very strong interactions between adjacent primary particles or crystallites, namely, by the multiple actions of van der Waals force and Coulomb interaction between crystal faces.

In the forming step S1, next, the chamber and the contents thereof are cooled by leaving them stand at room temperature typically for 24 hours. After the natural cooling, a nanodiamond crude product (including nanodiamond particle agglutinates formed in the above manner, and soot) attached to the chamber inner wall is collected and recovered by scraping off using a spatula. The forming step S1 as above, when repeatedly performed in a necessary number of times, can give the nanodiamond crude product in a desired amount.

The purifying step S2, according to the embodiment, includes an acid treatment in which the material nanodiamond crude product is acted upon typically by a strong acid in a water medium. The nanodiamond crude product obtained by the detonation technique tends to include metal oxides. The metal oxides are oxides of metals, such as Fe, Co, and Ni, derived typically from the chamber used in the detonation technique. The metal oxides can be dissolved off from, and removed from, the nanodiamond crude product typically by the action of a predetermined strong acid in a water medium (acid treatment). The strong acid for use in the acid treatment is preferably selected from mineral acids, such as hydrochloric acid, hydrofluoric acid, sulfuric acid, nitric acid, and aqua regia. The acid treatment may employ each of different strong acids alone or in combination. The strong acid(s) may be used in the acid treatment in a concentration of typically 1 to 50 mass percent. The acid treatment may be performed at a temperature of typically 70° C. to 150° C. for a time of typically 0.1 to 24 hours. The acid treatment can be performed under reduced pressure, or at normal atmospheric pressure, or under pressure (under a load). After the acid treatment as above, solids (including nanodiamond agglutinates) are washed with water typically by decantation. The water washing of the solids by decantation is preferably repeated until the pH of a sedimentary solution reaches, for example, 2 to 3.

The purifying step S2, according to the embodiment, also includes an oxidation using an oxidizer so as to remove graphite from the nanodiamond crude product (nanodiamond agglutinates before the completion of purification). The nanodiamond crude product obtained by the detonation technique includes graphite. The graphite is derived from carbon that has not formed nanodiamond crystals, out of carbons liberated from the explosive as a result of partial incomplete combustion. The graphite can be removed from the nanodiamond crude product typically by allowing a predetermined oxidizer to act upon the crude product in a water medium (oxidation), typically after the acid treatment. Non-limiting examples of the oxidizer for use in the oxidation include chromic acid, chromic anhydride, dichromic acid, permanganic acid, perchloric acid, and salts of them. The oxidation may employ each of different oxidizers alone or in combination. The oxidizer(s) may be used in the oxidation in a concentration of typically 3 to 50 mass percent. The oxidizer may be used in the oxidation in an amount of typically 300 to 500 parts by mass per 100 parts by mass of the nanodiamond crude product to be subjected to the oxidation. The oxidation may be performed at a temperature of typically 100° C. to 200° C. for a time of typically 1 to 24 hours. The oxidation can be performed under reduced pressure, or at normal atmospheric pressure, or under pressure (under a load). The oxidation is preferably performed in the coexistence of a mineral acid, from the viewpoint of contributing to more efficient graphite removal. Non-limiting examples of the mineral acid include hydrochloric acid, hydrofluoric acid, sulfuric acid, nitric acid, and aqua regia. The mineral acid, when used in the oxidation, may be used in a concentration of typically 5 to 80 mass percent. After the oxidation as above, solids (including nanodiamond agglutinates) are washed with water typically by decantation or centrifugal sedimentation. A supernatant in the early stages of the water washing is colored. The water washing of the solids is preferably repeated until the supernatant becomes visually transparent. The water washing, when repeated, reduces or eliminates electrolytes (such as NaCl) as impurities. The resulting low electrolyte concentration is advantageous for allowing the nanodiamond particles produced by the method to actually have high dispersibility and high dispersion stability.

The nanodiamond after the oxidation as above may be treated with an alkaline solution. The alkaline treatment can convert an acidic functional group (such as carboxy group) at the surface of the nanodiamond into a salt (such as a carboxylate). A non-limiting example of the alkaline solution for use herein is an aqueous sodium hydroxide solution. The alkaline treatment may be performed at an alkaline solution concentration of typically 1 to 50 weight percent and a treatment temperature of typically 70° C. to 150° C. for a treatment time of typically 0.1 to 24 hours. After the alkaline treatment as above, the nanodiamond may be treated with an acid solution. The acid treatment, when performed, can allow the salt of the acidic functional group at the nanodiamond surface to be returned again to a free acidic functional group. A non-limiting example of the acid solution for use herein is hydrochloric acid. The acid treatment may be performed at room temperature, or with heating. The nanodiamond, which has undergone the alkaline treatment after the oxidation, or further undergone the subsequent acid treatment, are subjected to washing of solids (including nanodiamond agglutinates) with water typically by decantation or centrifugal sedimentation.

The pH-adjusting step S3 is subsequently performed in the method. The pH-adjusting step S3 is the step of adjusting the pH of a solution to a predetermined pH, prior to the after-mentioned drying step S4, where the solution contains the nanodiamond agglutinates after the purifying step S2. In this step, for example, a sedimentary solution (including nanodiamond agglutinates) resulting from the purifying step S2 is combined with ultrapure water to give a suspension, and the suspension is combined with at least one of an acid and an alkali. A non-limiting example of the alkali usable herein is sodium hydroxide. In the step, the pH of the suspension is adjusted to preferably 8 to 12, and more preferably 9 to 11.

The drying step S4 is subsequently performed in the method. In this step, for example, a liquid is evaporated, using an evaporator, from the solution resulting from the pH-adjusting step S3 to leave solids, and the residual solids are dried by heating in a drying oven. The drying by heating is performed at a temperature of typically 40° C. to 150° C. The drying step S4 can give a powder of nanodiamond agglutinates.

The modifying step S5 is subsequently performed in the method. The modifying step S5 is the step of performing surface modification by bonding a predetermined silane coupling agent to nanodiamond particles contained in nanodiamond agglutinates obtained typically by the above procedure. In the modifying step S5, initially, a mixture containing dried nanodiamond (nanodiamond agglutinates) obtained typically by the above procedure, a silane coupling agent, and a medium is stirred in a reactor. Next, the mixture in the reactor is combined with zirconia beads as a deagglutination medium. The zirconia beads have diameters of typically 15 to 500 µm. Next, the nanodiamond in the mixture (solution) is subjected to a modification treatment using an ultrasonic generator including an oscillator that can generate ultrasonic waves. Specifically, the oscillator of the ultrasonic generator is inserted, at its tip, into the reactor, immersed in the mixture (solution), and is allowed to generate ultrasonic waves. The modification treatment is preferably performed while cooling the mixture (solution) typically with iced water. The modification treatment is performed for a time of typically 4 to 10 hours. The solution to be subjected to the treatment contains the nanodiamond in a proportion of typically 0.5 to 5 mass percent and the silane coupling agent in a concentration of typically 5 to 40 mass percent. Non-limiting examples of the medium for use herein include tetrahydrofuran, acetone, methyl ethyl ketone, 1-methoxypropanol, methyl isobutyl ketone, isopropanol, and 2-butanol. The ratio (mass ratio) of the nanodiamond to the silane coupling agent in the solution is typically from 2:1 to 1:10. In the modification treatment, cavitation occurs due to acoustic effects in the solution to be irradiated with the ultrasonic waves, jet blast is formed upon fine bubble collapse in the cavitation, and the jet blast gives large kinetic energy to the zirconia beads in the solution. The zirconia beads then give impact energy to the nanodiamond agglutinates in the same solution. This releases nanodiamond particles from the nanodiamond agglutinates (deagglutination) and allows the silane coupling agent to act upon and bond to the nanodiamond particles in a dissociated state. This bonding is a covalent bond formed through dehydrative condensation typically between a silanol group of the silane coupling agent and a surface hydroxy group of the nanodiamond particles. A hydrolyzable group, when contained in the silane coupling agent, can form a silanol group by the action even of a trace amount of water contained in the reaction system. The modifying step S5 as above can produce a surface-modified nanodiamond 20 including a ND particle 21 and a silane coupling agent 22 bonded to the ND particle 21. When the solution after the step includes unreacted nanodiamond agglutinates, a surface-modified-nanodiamond dispersion having a lower content of unreacted nanodiamond agglutinates can be obtained by leaving the solution stand to give a supernatant, and collecting the supernatant. The surface-modified-nanodiamond dispersion may be subjected to a medium replacement operation so as to replace the medium used in the modifying step S5 with another medium.

The resin composition X can be produced using the surface-modified nanodiamond 20, which is produced typically by the procedure as described above. Specifically, components are mixed, where the components are: the surface-modified-nanodiamond dispersion (containing the surface-modified nanodiamond 20) obtained typically by the above procedure; the curable resin component 10 prepared separately; the dispersion medium 30; and other components, such as a polymerization initiator, added as needed.

The resin composition X, which contains the curable resin component 10, the surface-modified nanodiamond 20, and the dispersion medium 30, can be produced by the procedure as described above. The resin composition X as above can form a cured resin portion or cured resin layer (cured resin film). To form the cured resin portion, for example, the resin composition X is applied onto a substrate, the dispersion medium 30 is eliminated from the resin composition X on the substrate typically through evaporation/diffusion typically by heating, and the resin composition X on the substrate is then cured typically by the application of at least one of light and heat.

The surface-modified nanodiamond 20 in the resin composition X each include the silane coupling agent 22 having a (meth)acryloyl-containing organic chain, as a surface-modifying component that is bonded via a covalent bond to the ND particle 21, as described above. The (meth)acryloyl-containing organic chain in the silane coupling agent 22 is positioned in the surface-modified nanodiamond 20 near to the interface with surroundings of the surface-modified nanodiamond 20. The ND particles 21 with surface modification in the embodiment as above have higher affinity for organic materials, as compared with nanodiamond particles without surface modification. Accordingly, the surface-modified nanodiamond 20 is suitable for actually having high dispersion stability in the resin composition X, which contains the curable resin component 10 and the organic medium together with the surface-modified nanodiamond 20.

In addition, the surface-modified nanodiamond 20 contains a (meth)acryloyl group in the organic chain present at the interface with surrounding thereof, where the (meth)acryloyl group serves as a polymerizable group. In a process of polymerization of the curable resin component 10 in the resin composition X, the (meth)acryloyl group of the surface-modified nanodiamond 20 can copolymerize with the curable resin component 10 to form a cured resin portion or cured resin layer. The cured resin portion or cured resin layer contains the surface-modified nanodiamond 20 or the ND particle 21 as being included in the cured resin matrix. The surface-modified nanodiamond 20, which is suitable for actually having high dispersion stability in the resin composition X as described above, is suitable for allowing the ND particles 21 to disperse and to be included in the cured resin matrix. Specifically, in a configuration, the (meth)acryloyl group, which is a polymerizable group, is present at the surface of the surface-modified nanodiamond 20, which is suitable for actually having high dispersion stability in the resin composition X. This configuration is suitable for the formation of a nanocomposite material from the resin composition X, where the nanocomposite material includes a cured resin, and ND particles 21 dispersed in the cured resin matrix. In a configuration, the ND particles 21 are dispersed in the cured resin matrix of the cured resin portion or cured resin layer formed from the resin composition X, where the ND particles 21 are fine particles of diamond which has very high mechanical strength. This configuration is suitable for allowing the cured resin portion or cured resin layer to actually have both high transparency and high scratch resistance.

As described above, the resin composition X is suitable for the formation of a nanodiamond-dispersed cured resin portion having both high transparency and high scratch resistance. The resin composition X preferably contains zirconium in a proportion of 0.01 mass percent or more of the totality of the surface-modified nanodiamond 20 and the zirconium. This configuration probably facilitates the stable dispersion of the surface-modified nanodiamond 20 in the resin composition X.

FIG. 3 is a local sectional view of an optical element Y according to another embodiment of the present invention. The optical element Y includes a transparent substrate 40 and a cured resin layer X', which is a nanodiamond-dispersed cured resin layer. The optical element Y is an optical element through which light passes and is exemplified by, but not limited to, transparent substrates for flat-panel displays such as liquid crystal displays, organic electroluminescence displays, and plasma displays; lenses; and transparent panels for touch screens (touch panels).

The transparent substrate 40 is a transparent component that constitutes a principal structural component of the optical element Y and includes a region through which light passes. The transparent substrate 40 as above is made typically from a resinous material or a glass material. Examples of the resinous material to form the transparent substrate 40 include, but are not limited to, cellulose acetate films, polyester films, polycarbonate films, and polynorbornene films. Non-limiting examples of the cellulose acetate films include triacetyl cellulose films, diacetyl cellulose films, cellulose acetate propionate films, and cellulose acetate butyrate films. Non-limiting examples of the polyester films include poly(ethylene terephthalate) films and poly(ethylene naphthalate) films. The transparent substrate 40 has a haze of preferably 2.0% or less, and more preferably 1.0% or less, from the viewpoint of allowing the optical element Y to actually have sufficient optical transparency. As used in the embodiment, the "haze" is defined as a value measured in conformity to JIS K 7136. The transparent substrate 40 has a thickness of preferably 400 μm or less, and more preferably 200 μm or less, from the viewpoint of allowing the optical element Y to actually have sufficient optical transparency.

The cured resin layer X' is formed from the resin composition X (not shown for the internal structure) and is disposed so as to cover at least part of the light-transmitting region of the transparent substrate 40. Specifically, the optical element Y includes a portion formed from the resin composition X in at least part of the light-transmitting region. The cured resin layer X' has a thickness of typically 0.01 to 100 μm. The cured resin layer X' is formed from the resin composition X, which is suitable for the formation of a cured resin portion having both high transparency and high scratch resistance, as described above. The cured resin layer X' can function as an outermost layer of a multilayered hardcoat layer, and/or as a hardcoat layer. Assume that, for example, the refractive index and/or the thickness of the cured resin layer X' is set according typically to the refractive index of the transparent substrate 40. In this case, the cured resin layer X' can function as an index matching film and/or as an antireflective film. Assume that the cured resin layer X', together with the transparent substrate 40, constitutes a hardcoat layer. In this case, the optical element Y has a thickness of preferably 50 μm or less, and more preferably 20 μm or less, from the viewpoint of actually offering sufficient optical transparency and satisfactory bendability.

The multilayered portion including the transparent substrate 40 and the cured resin layer X' in the optical element Y has a haze of preferably 2.0% or less, and more preferably 1.0% or less, from the viewpoint of allowing the optical element Y to actually have sufficient optical transparency.

The optical element Y as above can be produced typically by applying the resin composition X onto the transparent substrate 40 to form a thin film, and drying and curing the thin film. Non-limiting examples of the coating process or device include bar coaters, spray coating, spin coaters, dip coaters, die coaters, comma coaters, and gravure coaters.

The optical element Y includes the cured resin layer X' formed from the resin composition X, where the resin composition X is suitable for the formation of a cured resin portion or cured resin layer having both high transparency and high scratch resistance. Accordingly, the optical element Y is suitable for actually providing an optical element that includes a cured resin portion or cured resin layer having both high transparency and high scratch resistance.

EXAMPLES

Production of ND Dispersion S1

A surface-modified-nanodiamond dispersion or surface-modified nanodiamond was produced through a forming step, a purifying step, a pH-adjusting step, a drying step, and a modifying step as described below.

In the forming step, initially, a shaped explosive equipped with an electric detonator was placed in a detonation pressure-tight chamber, and the chamber was hermetically sealed so that the explosive was coexistent with a gas having an atmospheric composition and being at normal atmospheric pressure. The chamber is made of iron and has a capacity of 15 m$^3$. The explosive used herein is a mixture (0.50 kg) of trinitrotoluene (TNT) with cyclotrimethylenetrinitramine, namely, hexogen (RDX). The explosive has a mass ratio (TNT:RDX) of TNT to RDX of 50:50. Next, the electric detonator was ignited to detonate the explosive in the chamber. Next, the chamber and contents thereof were cooled by leaving at room temperature for 24 hours. After the natural cooling, a nanodiamond crude product was recovered by scraping off and collecting the nanodiamond crude product (including agglutinates of nanodiamond particles formed by the detonation technique, and soot) attached to the chamber inner wall, using a spatula. The nanodiamond crude product was recovered in an amount of 0.025 kg.

Nanodiamond crude products obtained by performing the forming step multiple times were then subjected to an acid treatment in the purifying step. Specifically, 200 g of the nanodiamond crude products were combined with 6 L of 10 mass percent hydrochloric acid to give a slurry, and the slurry was subjected to a heat treatment under reflux at normal atmospheric pressure for one hour. The acid treatment was performed at a heating temperature of 85° C. to 100° C. Next, after cooling, solids (including nanodiamond agglutinates and soot) were washed with water by decantation. The water washing of solids by decantation was repeatedly performed until the pH of the sedimentary solution became from a low pH to 2.

Next, oxidation in the purifying step was performed. Specifically, initially, the sedimentary solution after the decantation was combined with 5 L of 60 mass percent aqueous sulfuric acid solution and 2 L of 60 mass percent aqueous chromic acid solution to give a slurry, and the slurry was subjected to a heat treatment under reflux at normal atmospheric pressure for 5 hours. This oxidation was performed at a heating temperature of 120° C. to 140° C. Next, after cooling, solids (including nanodiamond agglutinates) were washed with water by decantation. A supernatant at the beginning of the water washing was colored; and the water washing of solids by decantation was repeatedly performed until the supernatant became visually transparent. Next, the sedimentary solution obtained by the final decantation in the process of repeated water washing was combined with 1 L of a 10 mass percent aqueous sodium hydroxide solution and then subjected to a heat treatment under reflux at normal atmospheric pressure for one hour. This treatment was performed at a heating temperature of 70° C. to 150° C. Next, after cooling, a sedimentary solution was obtained by decantation, and the sedimentary solution was adjusted to have a pH of 2.5 by the addition of 20 mass percent hydrochloric acid. Solids in the sedimentary solution were then washed with water by centrifugal sedimentation.

Next, the pH-adjusting step was performed. Specifically, precipitates obtained through the water washing by centrifugal sedimentation were combined with ultrapure water to give a suspension having a solids concentration of 8 mass percent, and the suspension was combined with sodium hydroxide to have an adjusted pH of 10. Thus, a slurry having an adjusted pH was prepared.

Next, the drying step was performed. Specifically, a liquid was evaporated using an evaporator from the aqueous nanodiamond dispersion resulting from the pH-adjusting step, to leave solids, and the residual solids were dried by heating in a drying oven. The drying by heating was performed at a temperature of 120° C.

Next, the modifying step was performed. Specifically, initially, 0.15 g of a nanodiamond powder obtained through the drying step was weighed in a 50-ml sample vial, and the nanodiamond powder was preliminarily dried at 150° C. for one hour. Next, the nanodiamond powder was mixed with 14 g of a medium tetrahydrofuran (THF) and 1 g of a silane coupling agent 3-(trimethoxysilyl)propyl acrylate (supplied by Tokyo Chemical Industry Co., Ltd.) to give a solution, and the solution was stirred for 10 minutes. Next, the solution was combined with 34 g of zirconia beads (trade name DZBφ30, having a reference diameter of 20 to 40 µm, supplied by Daiken Chemical Co., Ltd.). Next, the mixed solution was subjected to a modification treatment using a homogenizer Ultrasonic Disperser UH-6005 (trade name, supplied by SMT Co., Ltd.), which serves as an ultrasonic generator. Specifically, an oscillator of the ultrasonic generator was inserted, at its tip, into the reactor and immersed in the solution, and in this state, ultrasonic waves were generated from the oscillator. Thus, the mixed solution in the reactor was subjected to sonication or modification treatment for 8 hours while cooling the reactor with iced water. In this treatment, the solution, which was initially hazy gray, gradually became more transparent with being blackened. This was probably because nanodiamond particles were sequentially released (deagglutinated) from the nanodiamond agglutinates, the silane coupling agent acted upon and was bonded to the nanodiamond particles in a dissociation state, and the nanodiamond particles whose surfaces had been modified in the above manner were stably dispersed in the THF medium. The particle diameter D50 (median diameter) of the surface-modified nanodiamond after the 8-hour modification treatment was measured by a dynamic light scattering technique as described below, and was found to be 15 nm. Thus, a surface-modified-nanodiamond dispersion (ND dispersion S1) or surface-modified nanodiamond was produced.

The ND dispersion S1 obtained by the procedure as described above was left stand for a whole day and night, from which a supernatant was collected. Next, the supernatant was added dropwise (in a total amount of 10 ml) to a media mixture of 16 ml of toluene and 4 ml of hexane. As a result of the dropwise addition, the supernatant, which was initially transparent black, changed to hazy gray in the media mixture. The media mixture after the dropwise addition was subjected to a centrifugal separation treatment using a centrifuge, to give sedimentary solids, and the solids (surface-modified nanodiamond particles) were collected. The centrifugal separation treatment was performed at a centrifugal force of 20000×g for a centrifugation time of 10 minutes. The collected solids were dried and then subjected to a measurement of Zr content by inductively coupled plasma emission spectrometry as described later, and were found to have a Zr content of 7.1 mass percent.

Production of ND Dispersion S2

Another surface-modified-nanodiamond dispersion (ND dispersion S2) or surface-modified nanodiamond was produced through a series of steps (a forming step, a purifying step, a pH-adjusting step, a drying step, and a modifying step) similar to those described above for the production of the ND dispersion S1, except for using, as the silane coupling agent used in the modifying step, 1 g of 3-(trimethoxysilyl)propyl methacrylate (supplied by Tokyo Chemical Industry Co., Ltd.) instead of 3-(trimethoxysilyl) propyl acrylate. The particle diameter D50 (median diameter) of the surface-modified nanodiamond after the 8-hour modification treatment was measured by a dynamic light scattering technique as described later, and was found to be 19 nm. The Zr content of the surface-modified nanodiamond in the ND dispersion S2 was measured by a procedure similar to that for the surface-modified nanodiamond in the ND dispersion S1 and was found to be 7.5 mass percent.

Production of ND Dispersion S3

Another nanodiamond dispersion (ND dispersion S3) was produced through a series of steps (a forming step, a purifying step, a pH-adjusting step, a drying step, and a modifying step) similar to those described above for the production of the ND dispersion S1, except for using no zirconia bead in the modifying step. The mixed solution (containing nanodiamond agglutinates and a silane coupling agent), which was subjected to sonication in the modifying step, remained original hazy gray even after 8-hour sonication and included sediment. Accordingly, it is considered that the silane coupling agent is not bonded to the nanodiamond contained in the ND dispersion S3. The sediment was dried, the Zr content of which was measured by the inductively coupled plasma emission spectrometry and was found be less than 0.01 mass percent.

Production of Hardcoat PET Film

A PET film having a surface hardcoat was produced by a procedure as follows. Specifically, initially, 30 parts by mass of a urethane acrylate KRM8200 (trade name, supplied by DAICEL-ALLNEX LTD.), 70 parts by mass of methyl ethyl ketone, and 2 parts by mass of a photoinitiator Irgacure 184 (trade name, supplied by BASF SE) were placed in a light-shielding bottle, were mixed, and yielded a hardcoat coating material. Next, the hardcoat coating material was applied by flow casting onto a 75-μm thick easily-adhesive PET film A-4300 (trade name, supplied by Toyobo Co. Ltd.) using a wire bar to form a coat layer, and the coat layer was dried at 80° C. for one minute using a dryer (the coat layer after drying had a thickness of 5 μm). Next, the coat layer on the PET film was irradiated with ultraviolet radiation in a nitrogen atmosphere, using an ultraviolet irradiator ECS-4011GX (trade name, with a high-pressure mercury lamp light source, supplied by Eye Graphics Co., Ltd.). The ultraviolet irradiation was performed at a light source output of 4 kW and a conveying speed of a conveyor of 4 m/min, where the conveyor carried the irradiation target. Thus, a hardcoat PET film was produced.

Example 1

The ND dispersion S1 was left stand for a whole day and night, from which a supernatant was collected, and the supernatant was added dropwise (in a total amount of 10 ml) to a media mixture of 16 ml of toluene and 4 ml of hexane. The media mixture after the dropwise addition was subjected to a centrifugal separation treatment (at a centrifugal force of 20000×g for a centrifugation time of 10 minutes) to sediment solids (surface-modified nanodiamond particles), and the solids were collected. The solids collected by the procedure as above were combined with tetrahydrofuran (THF) to give a THF solution of surface-modified nanodiamond (having a solids concentration of 3 mass percent). The solution was subjected to sonication for 10 minutes using a sonicator ASU-10 (trade name, supplied by AS ONE Corporation). The particle diameter D50 (median diameter) of the surface-modified nanodiamond in the THF solution after the sonication was measured by the dynamic light scattering technique as described later and was found to be 17 nm. Separately, the THF solution after the sonication (containing surface-modified nanodiamond derived from the ND dispersion S1 and having a solids concentration of 3 mass percent) and an antireflective coating material ELCOM P-5062 (trade name, containing fine hollow silica particles, having a solids concentration of 3 mass percent, supplied by JGC Catalysts and Chemicals Ltd.) were placed in a light-shielding bottle in such a proportional ratio that the amount of solids of the THF solution be 2 parts by mass per 100 parts by mass of solids of the antireflective coating material, followed by mixing for one hour using a shaker. Thus, an antireflective coating material including, as dispersed, the surface-modified nanodiamond derived from the ND dispersion S1 was produced. This had a concentration of the surface-modified nanodiamond of about 0.06 mass percent. Next, the antireflective coating material was applied onto the hardcoat layer of the hardcoat PET film by flow casting using a wire bar to form a coat layer, and the coat layer was dried at 80° C. for one minute using a dryer (the coat layer after drying had a thickness of 100 nm). Next, the coat layer on the hardcoat PET film was irradiated with ultraviolet radiation in a nitrogen atmosphere using an ultraviolet irradiator ECS-4011GX (trade name, with a high-pressure mercury lamp light source, supplied by Eye Graphics Co., Ltd.). The ultraviolet irradiation was performed at a light source output of 4 kW and a conveying speed of a conveyor of 2 m/min, where the conveyor carried the irradiation target. Thus, a hardcoat PET film with an antireflective layer according to Example 1 was produced.

Example 2

A hardcoat PET film with an antireflective layer according to Example 2 was produced by a procedure similar to that in Example 1, except for using the antireflective coating material ELCOM P-5062 (trade name, supplied by JGC Catalysts and Chemicals Ltd.) and the THF solution (containing surface-modified nanodiamond derived from the ND dispersion S1 and having a solids concentration of 3 mass percent) in such a proportional ratio that the amount of solids of the THF solution be 5 parts by mass, instead of 2 parts by mass, per 100 parts by mass of the solids of the antireflective coating material, to prepare an antireflective coating material (having a surface-modified nanodiamond concentration of about 0.15 mass percent); and using this antireflective coating material.

Example 3

The ND dispersion S2 was left stand for a whole day and night, from which a supernatant was collected, and the supernatant was added dropwise (in a total amount of 10 ml) to a media mixture of 16 ml of toluene and 4 ml of hexane. The media mixture after the dropwise addition was subjected to a centrifugal separation treatment (at a centrifugal force of 20000×g for a centrifugation time of 10 minutes) to sediment solids (surface-modified nanodiamond particles), and the solids were collected. The solids collected by the procedure as above were combined with tetrahydrofuran (THF) to give a THF solution of surface-modified nanodiamond (having a solids concentration of 3 mass percent). The solution was subjected to sonication for 10 minutes using a sonicator ASU-10 (trade name, supplied by AS ONE Corporation). The THF solution after the sonication (containing surface-modified nanodiamond derived from the ND dispersion S2 and having a solids concentration of 3 mass percent) and an antireflective coating material ELCOM P-5062 (trade name, containing fine hollow silica particles, having a solids concentration of 3 mass percent, supplied by JGC Catalysts and Chemicals Ltd.) were placed in a light-shielding bottle in such a proportional ratio that the amount of solids of the THF solution be 5 parts by mass per 100 parts by mass of solids of the antireflective coating material, followed by mixing for one hour using a shaker. Thus, an antireflective coating material including, as dispersed, the surface-modified nanodiamond derived from the ND dispersion S2 was produced. This had a surface-modified nanodiamond concentration of about 0.15 mass percent. Next, the antireflective coating material was applied onto the hardcoat layer of the hardcoat PET film by flow casting using a wire bar to form a coat layer, and the coat layer was dried at 80° C. for one minute using a dryer (the coat layer after drying had a thickness of 100 nm). Next, the coat layer on the hardcoat PET film was irradiated with ultraviolet radiation in a nitrogen atmosphere using an ultraviolet irradiator ECS-4011GX (trade name, with a high-pressure mercury lamp light source, supplied by Eye Graphics Co., Ltd.). The ultraviolet irradiation was performed at a light source output of 4 kW and a conveying speed of a conveyor carrying the irradiation target of 2 m/min. Thus, a hardcoat PET film with an antireflective layer according to Example 3 was produced.

Comparative Example 1

A hardcoat PET film with an antireflective layer according to Comparative Example 1 was produced by a procedure similar to that in Examples 1 to 3, except for using an antireflective coating material ELCOM P-5062 (trade name, containing fine hollow silica particles, having a solids concentration of 3 mass percent, supplied by JGC Catalysts and Chemicals Ltd.), instead of the surface-modified-nanodiamond-containing antireflective coating material.

Comparative Example 2

A hardcoat PET film with an antireflective layer according to Comparative Example 2 was produced by a procedure similar to that in Example 3, except for using the ND dispersion S3, instead of the ND dispersion S2, to give an antireflective coating material (having a concentration of nanodiamond derived from the ND dispersion S3 of about 0.06 mass percent); and using this antireflective coating material.

Example 4

The ND dispersion S1 was left stand for a whole day and night, from which a supernatant was collected, and the supernatant was added dropwise (in a total amount of 10 ml) to a media mixture of 16 ml of toluene and 4 ml of hexane. The media mixture after the dropwise addition was subjected to a centrifugal separation treatment (at a centrifugal force of 20000×g for a centrifugation time of 10 minutes) to sediment solids (surface-modified nanodiamond particles), and the solids were collected. The solids collected by the procedure as above were combined with tetrahydrofuran (THF) to give a THF solution of surface-modified nanodiamond (having a solids concentration of 3 mass percent). The solution was subjected to sonication for 10 minutes using a sonicator ASU-10 (trade name, supplied by AS ONE Corporation). The THF solution after the sonication (containing the surface-modified nanodiamond derived from the ND dispersion S1 and having a solids concentration of 3 mass percent) and a multifunctional acrylate mixture PETIA (trade name, having an acid value of 10 and a hydroxy value of 100, supplied by DAICEL-ALLNEX LTD.), which is a mixture of pentaerythritol triacrylate and pentaerythritol tetraacrylate, were placed in a light-shielding bottle in such a proportional ratio that the amount of solids of the THF solution be 40 parts by mass per 60 parts by mass of the multifunctional acrylate mixtures. In addition, per 100 parts by mass of these components, 2 parts by mass of a photoinitiator Irgacure 184 (trade name, supplied by BASF SE) were further placed in the light-shielding bottle, followed by mixing for one hour using a shaker. Thus, a coating material including, as dispersed, the surface-modified nanodiamond derived from the ND dispersion S1 was produced. This coating material was for the formation of an index matching film. Next, the index matching film-forming coating material was applied onto the hardcoat layer of the hardcoat PET film by flow casting using a wire bar to form a coat layer, and the coat layer was dried at 80° C. for one minute using a dryer (the coat layer after drying had a thickness of 200 nm). Next, the coat layer on the hardcoat PET film was irradiated with ultraviolet radiation in a nitrogen atmosphere using an ultraviolet irradiator ECS-4011GX (trade name, with a high-pressure mercury lamp light source, supplied by Eye Graphics Co., Ltd.). The ultraviolet irradiation was performed at a light source output of 4 kW and a conveying speed of a conveyor carrying the irradiation target of 2 m/min. Thus, a hardcoat PET film with an index matching film according to Example 4 was produced.

Example 5

A hardcoat PET film with an index matching film according to Example 5 was produced by a procedure similar to that in Example 4, except for using the multifunctional acrylate mixture PETIA (trade name, supplied by DAICEL-ALLNEX LTD.) and the THF solution (containing the surface-modified nanodiamond derived from the ND dispersion S1 and having a solids concentration of 3 mass percent) in such a proportional ratio that the amount of solids of the THF solution be 60 parts by mass per 40 parts by mass of the multifunctional acrylate mixture.

Comparative Example 3

A hardcoat PET film with an index matching film according to Comparative Example 3 was produced by a procedure similar to that in Example 4, except for using the ND dispersion S3, instead of the ND dispersion S1, to give a THF solution (containing nanodiamond derived from the ND dispersion S3 and having a solids concentration of 3 mass percent); and using this THF solution.

Example 6

The ND dispersion S1 was left stand for a whole day and night, from which a supernatant was collected, and the supernatant was added dropwise (in a total amount of 10 ml) to a media mixture of 16 ml of toluene and 4 ml of hexane. The media mixture after the dropwise addition was subjected to a centrifugal separation treatment (at a centrifugal force of 20000×g for a centrifugation time of 10 minutes) to sediment solids (surface-modified nanodiamond particles), and the solids were collected. The solids collected by the procedure as above were combined with tetrahydrofuran (THF) to give a THF solution of surface-modified nanodiamond (having a solids concentration of 3 mass percent), and the solution was subjected to sonication for 10 minutes using a sonicator ASU-10 (trade name, supplied by AS ONE Corporation). A mixture was then prepared and mixed for one hour using a shaker, where the mixture contained the THF solution after the sonication (containing the surface-modified nanodiamond derived from ND dispersion S1 and having a solids concentration of 3 mass percent) and a multifunctional acrylate mixture PETIA (trade name, having an acid value of 10 and a hydroxy value of 100, supplied by DAICEL-ALLNEX LTD.), which is a mixture of pentaerythritol triacrylate and pentaerythritol tetraacrylate, in such a proportional ratio that the amount of solids of the THF solution be 1 part by mass per 100 parts by mass of the multifunctional acrylate mixture; and further contained 60 parts by mass of tetrahydrofuran and 2 parts by mass of a photoinitiator Irgacure 184 (trade name, supplied by BASF SE). Thus, a hardcoat coating material including, as dispersed, the surface-modified nanodiamond derived from the ND dispersion S1 was produced. Next, the hardcoat coating material was applied onto a 75-μm thick easily-adhesive PET film A-4300 (trade name, supplied by Toyobo Co. Ltd.) by flow casting using a wire bar to form a coat layer, and the coat layer was dried at 80° C. for one minute using a dryer (the coat layer after drying had a thickness of 5 μm). Next, the coat layer on the PET film was irradiated with ultraviolet radiation in a nitrogen atmosphere using an ultraviolet irradiator ECS-4011GX (trade name, with a high-pressure mercury lamp light source, supplied by Eye Graphics Co., Ltd.). The ultraviolet irradiation was performed at a light source output of 4 kW and a conveying speed of a conveyer carrying the irradiation target of 4 m/min. Thus, a hardcoat PET film according to Example 6 was produced.

Example 7

A hardcoat PET film according to Example 7 was produced by a procedure similar to that in Example 6, except for using the ND dispersion S2, instead of the ND dispersion S1, to give a THF solution (containing nanodiamond derived from the ND dispersion S2 and having a solids concentration of 3 mass percent); and using this THF solution.

Comparative Example 4

A hardcoat PET film according to Comparative Example 4 was produced by a procedure similar to that in Example 6, except for using the ND dispersion S3, instead of the ND dispersion S1, to give a THF solution (containing nanodiamond derived from the ND dispersion S3 and having a solids concentration of 3 mass percent); and using this THF solution.

Comparative Example 5

A hardcoat PET film according to Comparative Example 5 was produced by a procedure similar to that in Example 6, except for using no surface-modified-nanodiamond-containing THF solution.

Comparative Example 6

A hardcoat PET film according to Comparative Example 6 was produced by a procedure similar to that in Example 6, except for using 40 parts by mass of dipentaerythritol hexaacrylate DPHA (trade name, having an acid value of 0.2 and a hydroxy value of 5, supplied by DAICEL-ALLNEX LTD.), which is a multifunctional acrylate, instead of 40 parts by mass of the multifunctional acrylate mixture PETIA (trade name, having an acid value of 10 and a hydroxy value of 100, supplied by DAICEL-ALLNEX LTD.), which is a mixture of pentaerythritol triacrylate and pentaerythritol tetraacrylate.

Median Diameter

The median diameter (particle diameter D50) of nanodiamond particles contained in an analyte nanodiamond dispersion was a value measured by a dynamic light scattering technique (noncontact backscatter mode) using an apparatus Zetasizer Nano ZS (trade name) supplied by Spectris Co., Ltd. Before the measurement, a sample nanodiamond dispersion was diluted with ultrapure water to a nanodiamond concentration of 0.2 to 2.0 mass percent, and then sonicated using an ultrasonic cleaner, to give the analyte.

ICP Emission Spectrometry

A sample nanodiamond dispersion was heated and thereby evaporated to remove water therefrom and to leave dry matter (powder), and 100 mg of the dry matter were placed in a porcelain crucible and, as intact, subjected to dry decomposition in an electric furnace. The dry decomposition was performed in three stages, namely, at 450° C. for one hour, subsequently at 550° C. for one hour, and subsequently at 650° C. for one hour. The residue in the porcelain crucible after the dry decomposition as above was combined with 0.5 ml of concentrated sulfuric acid and evaporated to dryness. The resulting residue remaining after evaporation to dryness was finally dissolved in 20 ml of ultrapure water. Thus, an analyte was prepared. The analyte was subjected to ICP emission spectrometry using an ICP emission spectrophotometer CIROS 120 (trade name, supplied by Rigaku Corporation). The analyte was prepared so that the detection lower limit in this analysis be 50 ppm by mass. Standard solutions for calibration curve plotting used in the analysis were prepared by appropriately diluting a mixed standard solution XSTC-22 (supplied by SPEX CertiPrep) and an atomic absorption analysis standard solution Zr1000 (supplied by Kanto Chemical Co., Inc.) each with an aqueous sulfuric acid solution having a concentration identical to the sulfuric acid concentration of the analyte. In the analysis, the content of zirconium (Zr) in the analyte was determined by performing an operation and analysis as above on a blank crucible to give a measured value, and subtracting this measured value (blank) from the measured value for the nanodiamond dispersion analyte, which is a measurement object.

Total Luminous Transmittance

The films according to Examples 1 to 7 and Comparative Examples 1 to 6 were each examined for total luminous transmittance (%) by measurement using a total luminous transmittance measuring apparatus NDH-5000W (trade name, supplied by Nippon Denshoku Industries Co., Ltd.). The measurement was performed in conformity to JIS K 7105. The results are given in Tables 1 to 3.

Haze

The films according to Examples 1 to 7 and Comparative Examples 1 to 6 were each examined for haze (%) by measurement using a haze meter NDH-5000W (trade name, supplied by Nippon Denshoku Industries Co., Ltd.). The haze measurement was performed in conformity to JIS K 7136. The results are given in Tables 1 to 3.

Refractive Index

The films according to Examples 4 and 5 and Comparative Example 3 were each examined for refractive index by measurement using a refractive index measuring apparatus NDH-5000Ws (trade name, supplied by Nippon Denshoku Industries Co., Ltd.). The refractive index measurement was performed in conformity to JIS K 7142. The results are given in Table 2.

Scratch Resistance

The films according to Examples 1 to 3, 6, and 7 and Comparative Examples 1, 2, and 4 to 6 were each subjected to a rubbing test on the surface bearing the coat layer, using a rubbing tester. The rubbing test was performed in a test environment at a temperature of 23° C. and relative humidity of 50%, using steel wool #0000 (supplied by Nippon Steel Wool Co., Ltd.) as a rubbing material. On the test target surface, the rubbing material traveled 10 cm under a load of 200 g (Examples 1 to 3 and Comparative Examples 1 and 2) or 2000 g (Examples 6 and 7 and Comparative Examples 4 to 6) with 50 reciprocating movements (Examples 1 to 3 and Comparative Examples 1 and 2) or with 1000 reciprocating movements (Examples 6 and 7 and Comparative Examples 4 to 6). In the rubbing test, the back side of each of the films after the rubbing operation was solidly shaded or painted with a black Magic Marker, and how the rubbed portion was scratched was visually observed using the reflected light. A sample in which no scratch was observed even by careful observation was evaluated as having very good scratch resistance (Very good); a sample in which at most five scratches were observed by careful observation was evaluated as having good scratch resistance (Good); and a sample in which scratches were apparently observed was evaluated as having poor scratch resistance (Poor). The results are given in Tables 1 and 3.

Evaluations

Among the films according to Examples 1 to 3 and Comparative Examples 1 and 2, which are hardcoat PET films with an antireflective layer, the films according to Examples 1 to 3, which included, as dispersed, the surface-modified nanodiamond (nanodiamond bearing the silane coupling agent) in the antireflective layer, offered higher scratch resistance, as compared with the film according to Comparative Example 1, which included no nanodiamond dispersed in the antireflective layer, and as compared with the film according to Comparative Example 2, which included no surface-modified nanodiamond dispersed in the antireflective layer. The films according to Examples 1 to 3 each had a significantly lower haze and offer better transparency, as compared with the film according to Comparative Example 2.

Among the films according to Examples 4 and 5 and Comparative Example 3, which are hardcoat PET films with an index matching film, the films according to Examples 4 and 5, which included surface-modified nanodiamond (nanodiamond bearing a silane coupling agent) dispersed in the index matching film, each had a significantly lower haze and offered better transparency, as compared with the film according to Comparative Example 3, which included no surface-modified nanodiamond dispersed in the index matching film.

Among the films according to Examples 6 and 7 and Comparative Examples 4 to 6, which are hardcoat PET films, the films according to Examples 6 and 7, which included surface-modified nanodiamond (nanodiamond bearing a silane coupling agent) dispersed in the hardcoat, offered higher scratch resistance, as compared with the film according to Comparative Example 5, which included no nanodiamond dispersed in the hardcoat, and as compared with the films according to Comparative Examples 4 and 6, which included no surface-modified nanodiamond dispersed in the hardcoat. In addition, the films according to Examples 6 and 7 each had a significantly lower haze and offered better transparency, as compared with the films according to Comparative Examples 4 and 6.

The films according to Comparative Examples 2 to 4, each of which included a coat layer containing nanodiamond derived from the ND dispersion S3, had a high haze and low transparency. This is probably because of aggregation of the nanodiamond derived from the ND dispersion S3.

TABLE 1

|  | Example 1 | Example 2 | Example 3 | Comp. Ex. 1 | Comp. Ex. 2 |
|---|---|---|---|---|---|
| ELCOM P-5062 (part by mass) | 100 | 100 | 100 | 100 | 100 |
| Nanodiamond material | ND1 | ND1 | ND2 | — | ND3 |
| Amount of nanodiamond (part by mass) | 2 | 5 | 5 | 0 | 5 |
| Total luminous transmittance (%) | 94.9 | 94.7 | 94.6 | 95.1 | 94.4 |
| Haze (%) | 0.8 | 0.6 | 0.6 | 0.7 | 9.5 |
| Scratch resistance | Good | Very good | Very good | Poor | Poor |

TABLE 2

|  | Example 4 | Example 5 | Comp. Ex. 3 |
|---|---|---|---|
| Multifunctional acrylate PETIA (part by mass) | 60 | 40 | 60 |
| Nanodiamond material | ND1 | ND1 | ND3 |
| Amount of nanodiamond (part by mass) | 40 | 60 | 40 |
| Total luminous transmittance (%) | 90.2 | 88.1 | 88.2 |
| Haze (%) | 0.6 | 0.5 | 18.5 |
| Refractive index | 1.624 | 1.702 | 1.621 |

TABLE 3

|  | Example 6 | Example 7 | Comp. Ex. 4 | Comp. Ex. 5 | Comp. Ex. 6 |
|---|---|---|---|---|---|
| Multifunctional acrylate PETIA (part by mass) | 100 | 100 | 100 | 100 | — |
| Multifunctional acrylate DPHA (part by mass) | — | — | — | — | 100 |
| Nanodiamond material | ND1 | ND2 | ND3 | — | ND1 |
| Amount of nanodiamond (part by mass) | 1 | 1 | 1 | 0 | 1 |
| Total luminous transmittance (%) | 91.2 | 90.9 | 90.7 | 91.2 | 90.5 |
| Haze (%) | 0.6 | 0.5 | 10.2 | 0.6 | 4.5 |
| Scratch resistance | Very good | Very good | Good | Good | Good |

As a summary of the above description, configurations and variations thereof according to the present invention are listed as appendices below.

APPENDIX 1

A curable resin composition containing:
a curable resin component;
a surface-modified nanodiamond including:
a nanodiamond particle; and
a silane coupling agent having a (meth)acryloyl-containing organic chain and being bonded to the nanodiamond particle; and
an organic medium.

APPENDIX 2

The curable resin composition according to appendix 1, wherein the nanodiamond particle is a detonation nanodiamond particle.

APPENDIX 3

The curable resin composition according to one of appendices 1 and 2, wherein the surface-modified nanodiamond has a median diameter of 50 nm or less.

APPENDIX 4

The curable resin composition according to one of appendices 1 and 2, wherein the surface-modified nanodiamond has a median diameter of 30 nm or less.

APPENDIX 5

The curable resin composition according to one of appendices 1 and 2, wherein the surface-modified nanodiamond has a median diameter of 20 nm or less.

APPENDIX 6

The curable resin composition according to any one of appendices 1 to 5, wherein the organic chain of the silane coupling agent is at least one of propyl acrylate and propyl methacrylate.

APPENDIX 7

The curable resin composition according to any one of appendices 1 to 6, wherein the curable resin component contains a (meth)acryloyl group.

APPENDIX 8

The curable resin composition according to any one of appendices 1 to 7, wherein the curable resin component is at least one selected from the group consisting of pentaerythritol triacrylate, pentaerythritol tetraacrylate, oligomers of pentaerythritol triacrylate, oligomers of pentaerythritol tetraacrylate, and oligomers of pentaerythritol triacrylate and pentaerythritol tetraacrylate.

APPENDIX 9

The curable resin composition according to any one of appendices 1 to 8, wherein the curable resin component is present in a proportion of 30 mass percent or more of the totality of solids contained in the composition.

APPENDIX 10

The curable resin composition according to any one of appendices 1 to 8, wherein the curable resin component is present in a proportion of 40 mass percent or more of the totality of solids contained in the composition.

APPENDIX 11

The curable resin composition according to any one of appendices 1 to 8, wherein the curable resin component is present in a proportion of 55 mass percent or more of the totality of solids contained in the composition.

APPENDIX 12

The curable resin composition according to any one of appendices 1 to 8, wherein the curable resin component is present in a proportion of 60 mass percent or more of the totality of solids contained in the composition.

APPENDIX 13

The curable resin composition according to any one of appendices 1 to 12, wherein the curable resin component is present in a proportion of 99.9 mass percent or less of the totality of solids contained in the composition.

APPENDIX 14

The curable resin composition according to any one of appendices 1 to 12, wherein the curable resin component is present in a proportion of 99 mass percent or less of the totality of solids contained in the composition.

APPENDIX 15

The curable resin composition according to any one of appendices 1 to 12, wherein the curable resin component is present in a proportion of 95 mass percent or less of the totality of solids contained in the composition.

APPENDIX 16

The curable resin composition according to any one of appendices 1 to 15, wherein the organic medium includes tetrahydrofuran.

APPENDIX 17

The curable resin composition according to any one of appendices 1 to 16, which contains zirconium in a proportion of 0.01 mass percent or more of the totality of the surface-modified nanodiamond and the zirconium.

APPENDIX 18

The curable resin composition according to any one of appendices 1 to 17, further containing hollow silica particles.

APPENDIX 19

The curable resin composition according to appendix 18, wherein the hollow silica particles have particle diameters of 1 nm or more.

APPENDIX 20

The curable resin composition according to one of appendices 18 and 19, wherein the hollow silica particles have particle diameters of 1000 nm or less.

APPENDIX 21

The curable resin composition according to one of appendices 18 and 19, wherein the hollow silica particles have particle diameters of 500 nm or less.

APPENDIX 22

The curable resin composition according to one of appendices 18 and 19, wherein the hollow silica particles have particle diameters of 300 nm or less.

APPENDIX 23

The curable resin composition according to any one of appendices 18 to 22, wherein the hollow silica particles are present in a content of 0.5 mass percent or more.

APPENDIX 24

The curable resin composition according to any one of appendices 18 to 22, wherein the hollow silica particles are present in a content of 1 mass percent or more.

APPENDIX 25

The curable resin composition according to any one of appendices 18 to 22, wherein the hollow silica particles are present in a content of 2 mass percent or more.

APPENDIX 26

The curable resin composition according to any one of appendices 18 to 25, wherein the hollow silica particles are present in a content of 90 mass percent or less.

APPENDIX 27

The curable resin composition according to any one of appendices 18 to 25, wherein the hollow silica particles are present in a content of 80 mass percent or less.

APPENDIX 28

The curable resin composition according to any one of appendices 18 to 25, wherein the hollow silica particles are present in a content of 60 mass percent or less.

APPENDIX 29

An optical element having a light-transmitting region and including a cured product of the curable resin composition according to any one of appendices 1 to 28 in at least part of the light-transmitting region.

APPENDIX 30

The optical element according to appendix 29, wherein the optical element has a multilayered portion including a substrate and the cured product, and wherein the multilayered portion has a haze of 2.0% or less.

APPENDIX 31

The optical element according to appendix 29, wherein the optical element has a multilayered portion including a substrate and the cured product, and wherein the multilayered portion has a haze of 1.0% or less.

REFERENCE SIGNS LIST

X resin composition (curable resin composition)
X' cured resin layer
Y optical element
10 the curable resin component
20 surface-modified nanodiamond
21 ND particle (nanodiamond particle)
22 silane coupling agent
30 dispersion medium

The invention claimed is:

1. A curable resin composition comprising:
a curable resin component;
a surface-modified nanodiamond comprising:
    a nanodiamond particle; and
    a silane coupling agent having a (meth)acryloyl-containing organic chain and being bonded to the nanodiamond particle;
an organic medium;
surface-unmodified hollow silica particles; and
zirconia in a proportion in terms of zirconium of 0.01 mass percent or more of a totality of the surface-modified nanodiamond and the zirconia;
wherein the surface-modified nanodiamond has a median diameter of 50 nm or less.

2. The curable resin composition according to claim 1, wherein the nanodiamond particle is a detonation nanodiamond particle.

3. The curable resin composition according to claim 1, wherein the organic chain of the silane coupling agent is at least one of propyl acrylate and propyl methacrylate.

4. The curable resin composition according to claim 1, wherein the curable resin component contains a (meth)acryloyl group.

5. The curable resin composition according to claim 1, wherein the curable resin component is at least one selected from the group consisting of:
pentaerythritol triacrylate;
pentaerythritol tetraacrylate;
oligomers of pentaerythritol triacrylate;
oligomers of pentaerythritol tetraacrylate; and
oligomers of pentaerythritol triacrylate and pentaerythritol tetraacrylate.

6. The curable resin composition according to claim 1, wherein the curable resin component is present in a proportion of 30 mass percent or more of a totality of solids contained in the composition.

7. The curable resin composition according to claim 1, wherein the organic medium comprises tetrahydrofuran.

8. The curable resin composition according to claim 1, wherein the hollow silica particles are present in a content of 0.5 mass percent or more.

9. An optical element having a light-transmitting region and comprising
a cured product of the curable resin composition according to claim 1 in at least part of the light-transmitting region.

10. The optical element according to claim 9, comprising a multilayered portion including:
    a substrate; and
    the cured product,
the multilayered portion having a haze of 2.0% or less.

11. The curable resin composition according to claim 2, wherein the organic chain of the silane coupling agent is at least one of propyl acrylate and propyl methacrylate.

12. The curable resin composition according to claim 2, wherein the curable resin component contains a (meth)acryloyl group.

13. The curable resin composition according to claim 3, wherein the curable resin component contains a (meth)acryloyl group.

14. The curable resin composition according to claim 2, wherein the curable resin component is at least one selected from the group consisting of:
pentaerythritol triacrylate;
pentaerythritol tetraacrylate;
oligomers of pentaerythritol triacrylate;
oligomers of pentaerythritol tetraacrylate; and
oligomers of pentaerythritol triacrylate and pentaerythritol tetraacrylate.

* * * * *